United States Patent [19]

Kurii

[11] 4,429,368
[45] Jan. 31, 1984

[54] MICROPROGRAM-TESTING APPARATUS

[75] Inventor: Hajime Kurii, Wako, Japan

[73] Assignee: Tokyo Shibaura Denki Kabushiki Kaisha, Kanagawa, Japan

[21] Appl. No.: 201,486

[22] PCT Filed: Oct. 19, 1979

[86] PCT No.: PCT/JP79/00265
§ 371 Date: Aug. 13, 1980
§ 102(e) Date: Aug. 13, 1980

[87] PCT Pub. No.: WO80/01323
PCT Pub. Date: Jun. 26, 1980

[30] Foreign Application Priority Data

Dec. 18, 1978 [JP] Japan .................. 53-156199

[51] Int. Cl.³ .................. G06F 9/22; G06F 11/00
[52] U.S. Cl. .................. 364/580; 371/19; 364/200
[58] Field of Search .................. 371/19; 364/580, 900, 364/200

[56] References Cited

U.S. PATENT DOCUMENTS 3,937,938  2/1976  Matthews ............... 371/19 X
3,987,420  10/1976 Badagnani .............. 371/19 X
4,118,789  10/1978 Casto et al. ............. 371/19 X
4,275,441  6/1981  Takeuchi .............. 371/19 X

FOREIGN PATENT DOCUMENTS 51-142939 of 0000 Japan.
52-2146  of 0000 Japan.
54-114144  9/1979 Japan .................. 371/19
54-152941 12/1979 Japan .................. 371/19
55-87250   7/1980 Japan .................. 371/19

Primary Examiner—Edward J. Wise
Attorney, Agent, or Firm—Oblon, Fisher, Spivak, McClelland & Maier

[57] ABSTRACT

An electronic computer is disclosed which includes microprogram memory in which a microinstruction is stored, a microaddress control unit for supplying an address to said memory and a register for holding a microinstruction read out of said microprogram memory, the contents of the microprogram memory are stored in the first section of the memory of the microprogram-testing apparatus. The second section of said memory is supplied with data for testing the microinstruction. While the microinstruction is executed, the microinstruction and test data are read out of said memory at the same time, and supplied to the error detector and trace control circuit. The microprogram-testing apparatus further comprises a function switching control circuit, which decides whether the error detector or trace control circuit should be enabled. Where the error detector is selected, then an error in the microprogram is detected. Where the trace control circuit is selected, then the execution of the microinstruction or the halt of said execution is controlled.

11 Claims, 15 Drawing Figures

F I G. 4
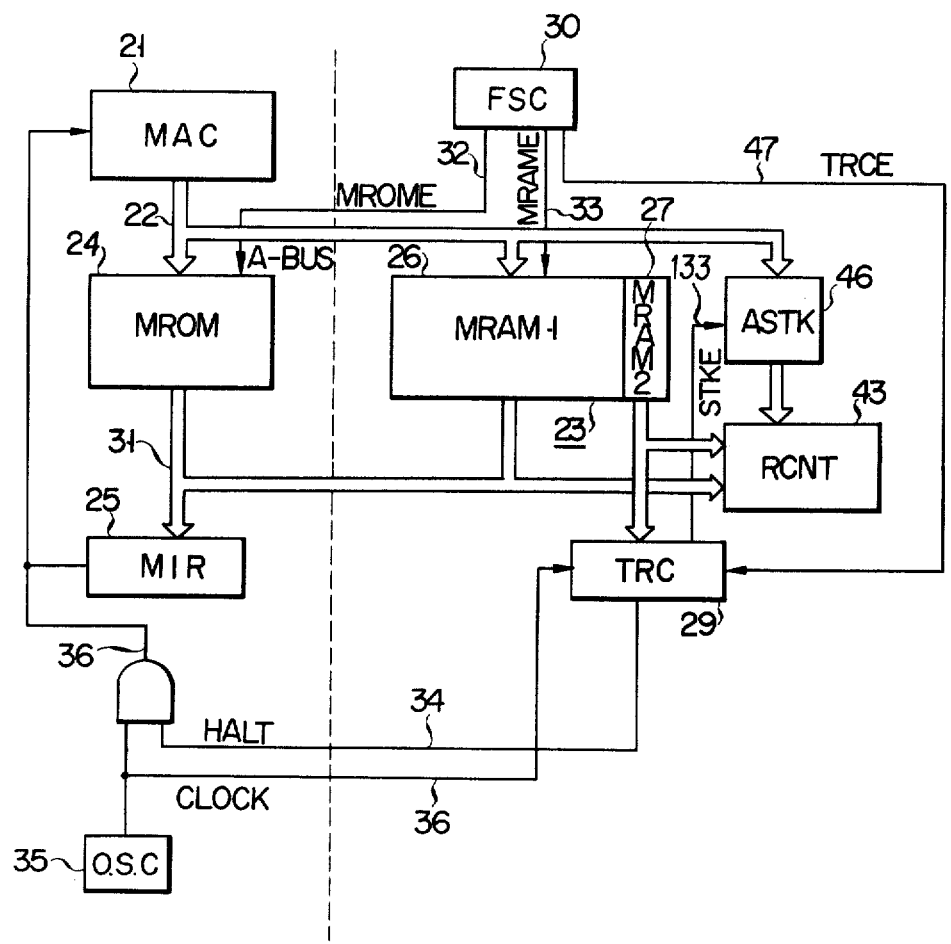

F I G. 7
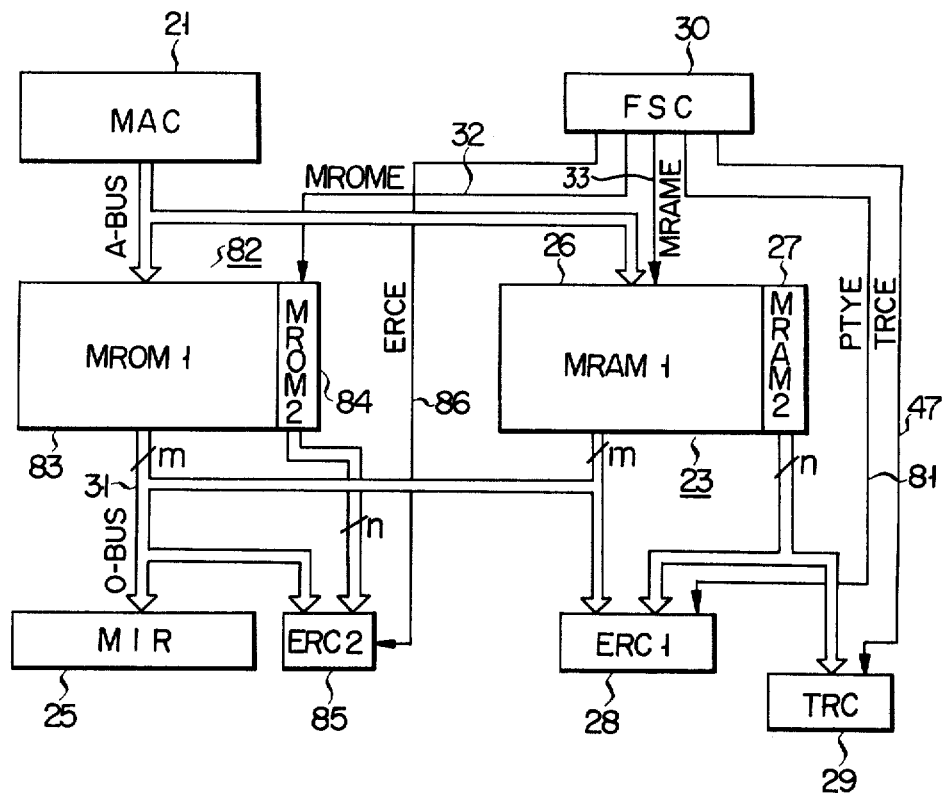

MICROPROGRAM-TESTING APPARATUS

TECHNICAL FIELD

This invention relates to a microprogram-testing apparatus which can efficiently test a microprogram being newly developed for a microprogram controlled computer.

BACKGROUND ART

With a microprogram controlled computer, it is generally unnecessary to rewrite the contents of a microprogram memory after storing a microprogram. Where, therefore, a test is going to be made of a newly developed microprogram, the conventional process comprises writing a microprogram directly in a read only memory and mounting said read only memory on a microprogram memory section (MROM) 12. A cicroaddress control section (MAC) 11 is connected to the MROM 121 to provide an address of a location of the MROM 12 wherein a microinstruction to be read out is stored. A microinstruction register (MIR) 13 is connected to the MROM 12 to hold the microinstruction thus read out.

However, the above-mentioned arrangement has the drawbacks that it is necessary to write a microprogram in a fresh memory, each time the contents of a previously prepared microprogram are amended, consuming a considerable length of time; and a memory in which data is once stored fails to allow for the rewriting of any data therein, and is unavoidably thrown away, resulting an increase in a test cost. Therefore, attempts have been made to apply, for example, a programmable read only memory (PROM) capable of rewriting of data. However, such attempts are also accompanied with the difficulties that it takes much time to write data in such a memory; and the access time of said memory is so slow that clock pulses used throughout a combination of a computer and test apparatus (hereinafter referred to as a system) must have a low frequency, with the resultant failure to test the characteristic of said memory with the real time.

To resolve the above-mentioned problems, attempts have been made to replace a read only memory (ROM) by a random access memory which has a relatively fast access time and allows for both reading and writing. Application of such a memory indeed makes it possible to freely rewrite the contents of a microprogram. And also the microprogram test with the real time can be made using such a memory. However, said RAM renders its contents subject to destruction by, for example, noises or drift of power source voltage. Where therefore, a microprogram is tested while being stored in such memory, and a prescribed control fails, then difficulties arise in judging whether said failure results from the errors of the microprogram itself or the destruction of the contents of the memory.

Proposals advanced for solution of the above-mentioned problems include a data-processing apparatus set forth in, for example, the Japanese patent disclosure 142,939 (1976). This apparatus comprises a control memory in which microinstructions are stored and a control memory address register holding address data to have an access to said control memory. With this apparatus, a plurality of address data paired with control code data are successively read out of an address-storing device. Comparison is made between said address data and the contents of the control memory address register in a comparator. Where a coincidence output is delivered from the comparator, the address-storing device is accessed to read out the control data. An operation mode is controlled by the control data thus read out.

However, the data-processing apparatus described in the above-mentioned Japanese patent disclosure 142,939 (1976) in which address data are successively read out of the address-storing device lacks a function of halting the execution of a microprogram at an optionally chosen address to read out the contents of a general register and main memory.

Further, the Japanese patent disclosure 2146 (1977) sets forth a debugging device for a small processor. This debugging device comprises a memory for temporary storage where a microprogram being tested is stored, an interface circuit connected to an input-output unit for the debugging device, a console and a console circuit which decodes an instruction issued from the console and supplies an instruction to the aforesaid memory for temporary storage and input-output unit for the debugging device. However, this debugging device fails to halt the execution of a microinstruction at the real time.

It is accordingly an object of this invention to provide a microprogram-testing apparatus free from the drawbacks accompanying the proposals advanced to date, which is connected to a computer body, and designed to ensure the free writing and reading of a microprogram, functions to detect the destruction of the contents of a memory, displays the log through which a microprogram has been executed, and halts said execution at any optional address of the microprogram to read out the contents of a general register and main memory.

DISCLOSURE OF INVENTION

A microprogram-testing apparatus embodying this invention causes all data on the detection of errors, the log through which a microinstruction is executed and the control of the halting of said execution to be stored in a microprogram memory capable of storing data having a greater word length than that of a microinstruction, thereby ensuring the efficient testing of the microprogram. Further, the microprogram-testing apparatus of the invention well serves the purpose simply by being connected to a computer body only when the microprogram is tested. Therefore, said apparatus reduces a load which might otherwise be imposed on the existing hardware of the computer body, and moreover makes it substantially unnecessary to reconstruct said hardware.

BRIEF DESCRIPTION OF DRAWINGS

FIG. 4 is block circuit diagram of a microprogram-testing apparatus according to still another embodiment of the invention;

FIG. 7 is a block circuit diagram of a microprogram-testing apparatus according to a still further embodiment of the invention;

BEST MODE OF CARRYING OUT THE INVENTION

Figure 1:
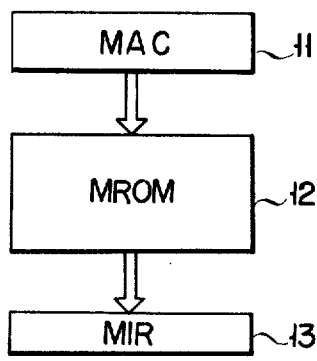
FIG. 1 is a block circuit diagram of an example of a control section for the reading of a microinstruction which is included in the prior art microprogram control type electronic computer.
Figure 2:
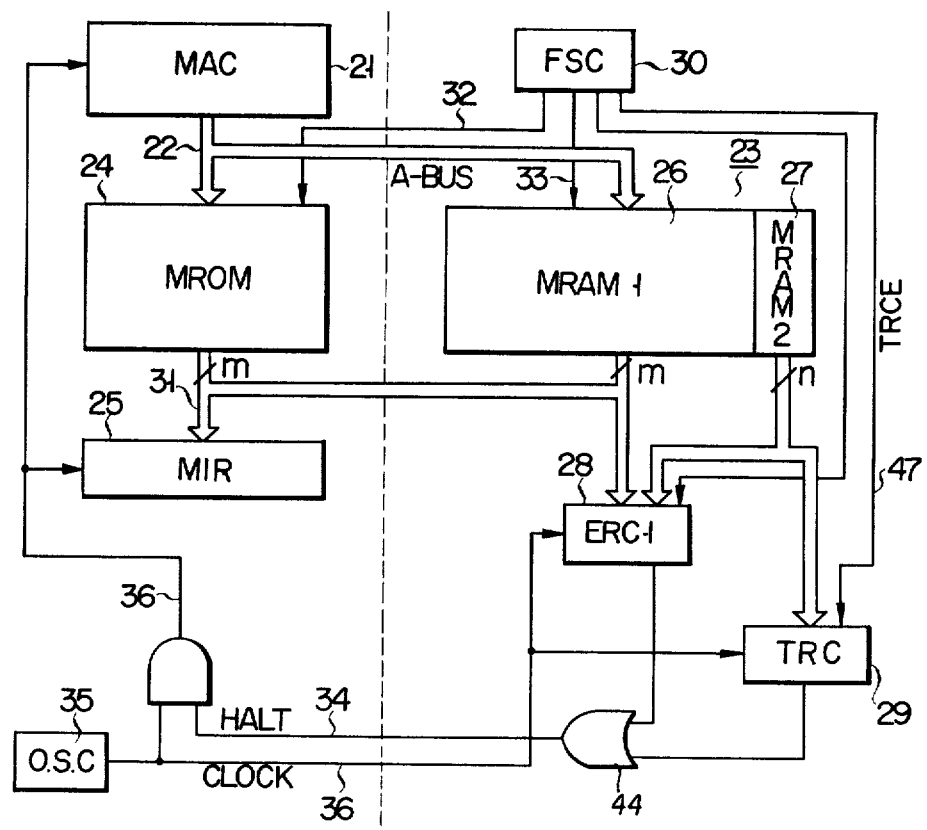
FIG. 2 is a block circuit diagram of microprogram-testing apparatus according to one embodiment of this invention and a microprogram control type electronic computer provided with said microprogram-testing apparatus.

Referring to FIG. 2, an address bus 22 of a microprogram address control unit 21 for controlling the address of a microprogram is connected to a first test microprogram memory 23 set in a test apparatus. The output terminal of the first microprogram memory 23 and the output terminal of a second microprogram memory 24 of a computer body are connected to a microinstruction register 25. The microprogram address control unit 21 may be formed of, for example, Am 2909 (microprogram sequencer) of Advanced Micro Devices, Inc. The first microprogram memory 23 and the second microprogram memory 24 may be formed of, for example, Intel 3216 and Intel 3625-2 of Intel corp. U.S.A. Further, the microinstruction register (MIR) 25 may be formed of, for example, AM 2918 of Advanced Micro Devices, Inc. U.S.A. The first microprogram memory 23 has a greater word length by one word than the second microprogram memory 24, and comprises a first section 26 having the same word length as the second microprogram memory 24 and a second section 27 which does not take part in controlling the computer body. The output terminal of the second section 27 is connected to an error detector 28 and a trace control circuit 29 both set in the test apparatus. The system is controlled by the first and second microprogram memories 23, 24 and function switching control circuit 30. In other words, the function switching control circuit 30 enables the first microprogram memory 23 set in the test apparatus and the second microprogram memory 24 included in the computer body to be interchangeably applied. A microprogram is tested by first storing the contents of said microprogram in the first microprogram memory 23. Where it is necessary to correct an error in said microprogram or amend its arrangement, the contents of that address of the first microprogram memory 23 regards as related to the above-mentioned requirement are changed according to a similar sequence as the write operation. In this case, it is of course possible to repeatedly write and read data. The first microprogram memory 23 comprises an element having an access time as short as or shorter than that of the second microprogram memory 24. The contents of an address of the MROM 24 specified by the microaddress control unit 21 are read out to the microinstruction register 25 through an O-BUS 31 to control the computer body. At this time, the function switching control circuit 30 prevents an output from being read out of the second microprogram memory 24 and allows an output to be issued from the first microprogram memory 23. When the test of a microprogram stored in the first microprogram memory 23 is brought to an end, then the tested microprogram is written into a read-only memory by an exclusive ROM writer. The read-only memory is loaded in the computer as the second microprogram memory 24. The function switching control circuit 30 allows an output to be read out of the second microprogram memory 24 upon receipt of an enable signal (MROME) 32 and prevents an output from being read out of the first microprogram memory 23 upon receipt of an enable signal (MRAME) 33. Thereafter, a final test is carried out by executing the tested microprogram stored in the MROM 24 in the computer body. Upon completion of said final test, the test apparatus is removed from the computer body. Under this condition, an output is allowed to be read out of the second microprogram memory 24.

The word length of the first microprogram memory 23 is made longer than that of the second microprogram memory 24. In second section 27 of the first microprogram memory 23 written is a test data of the microprogram. The test data is read out at the time when a microinstruction is read out and is fed to the error detector 28 and trace control circuit 29. These elements 28, 29 items effect various microprogram tests according to the test data. Both elements 28, 29 can be interchangeably enabled or disabled at the same time. This operation mode can be controlled by the function switching control circuit 30.

Description is now given of an embodiment where the second section 27 of the first microprogram memory 23 has a word length of one bit. For instance, one bit data of the second section 27 of the first microprogram memory 23 can control the stoppage of the execution of a microinstruction. In other words, a breakpoint can be set. Where the one bit is logic "0", a microinstruction stored in the same address of the first section 27 of the first microprogram memory 23 as that of the second section 27 of the memory 23 is read out and loaded to the microinstruction register 25 to control the computer body. As a result, the ordinary operation is carried out in preparation for the execution of a next microinstruction. When the above-mentioned bit of the second section 27 of the first microprogram memory 23 is logic "1", then the trace control circuit 29 is actuated to stop the execution of a microinstruction read out and to inform a test operator of said stoppage. In other words, when recognizing the bit as logic "1", the trace control circuit 29 of a clock control signal (HALT) 34 provides a clock control signal of logic "0" to an AND gate 14 through an OR gate 44. As a result, a system clock signal 36 supplied from a clock generator 35 to the respective parts of the computer body turns to logic "0" to stop the operation of the computer body. At the time of the stoppage, a attached to the test apparatus indicates the address with which the execution of a microprogram stop address is displayed.

The one bit of the second section 27 of the first microprogram memory 23 may also be used as a parity bit for a microinstruction. Where the RAM is used for storing a microprogram, then the contents of the RAM are sometimes destroyed, for example, by noises, or drift of power source voltage. Therefore, the RAM has a lower reliability than the ROM. Therefore, a parity bit is added to a microinstruction for one-bit error detection. Each time one instruction is read out, the error detector 28 detects the occurrence of any parity error during the execution of the read-out microinstruction. Where no parity error occurs, the error detector 28 allows the microinstruction to be executed. Conversely where a parity error occurs, the error detector 28 halts the execution of the microinstruction. At this time, the display unit (144 in FIG. 9) attached to the test apparatus indicates an address in which a parity error has occurred. The execution of the microinstruction is halted in the same manner as in the case of the previously described breakpoint.

Description is now given of another method by which the execution of a microinstruction is stopped. Where a computer body enables an interrupt in a microprogram, condition for stoppage is established with respect to a microprogram to be tested, then the execution of a microprogram can be stopped by applying interruption to the computer body and after indicating data on the item previously specified the interrupt signal can be applied to the computer body when the aforementioned condition for the stoppage is established. Then the computer body displays the item data specified by the operator and halts the execution of the microinstruction. Data on the item specified by the tester is displayed by an a microprogram for an interrupt processing stored in the first microprogram memory 23 together with a microprogram to be tested. Description is given of a system having the above-mentioned function with reference to FIG. 3. The parts of FIG. 3 the same as those of FIG. 2 are denoted by the same numerals, description thereof being omitted. First, the trace control circuit 29 demands the execution of a microinstruction to be stopped. As a result, an interruption-demanding signal (IRP) 37 is issued to the computer body. When approving a reason for a demanded interruption, the operation control provides an interrupt request signal (IRP) 37 to the computer body to the execution of a microinstruction. The central processing unit 38 including the microaddress control unit 21 and the microinstruction register 25 determines the interrupt signal and fetches the contents of an output register (OREG) 40 through an input-output bus (I/O bus) 39. Data may be supplied to the output register (OREG) 40 by an input-output bus control circuit (IOCNT) 41. Further, the IOCNT 41 has functions of loading, in the OREG 40, a read request for a general register specified by the operator and an address of the MROM 24 storing data to be read out respectively. When supplied with the contents of the output register (OREG) 40, the central processing unit (CPU) 38 determines the request signal from the microprogram-testing apparatus and reads the contents of of the general register or specified address. The data thus read out is fed to an input register (IREG) 42 through the input-output bus 39. The input-output bus control circuit (IOCNT) 41 unloads the contents of the input register (IREG) 42 and feeds them to a read control circuit (RCNT) 43 for the subsequent display thereof. The central processing unit (CPU) 38 fetches the contents of the output register 40 to fetches interrupt request. Then the circuit 38 feeds a predetermined data to the input register 42 in accordance with the microprogram for interrupt processing prestored in the first microprogram memory 23. After these processings, the operation control circuit 38 halts the execution of microinstructions enters into wait mode for receiving another interrupt request. The contents having the second section 27 of the same address as that of the first section 26 of the memory 23 are filled with "0", thereby inhibiting to produce further interrupt request during those processings.

The second section 27 of the first microprogram memory 23 may also be used to examine the log through which a microprogram has been executed. In other words, while a microprogram is being executed, a tracing function can be achieved by which the tester is informed of all the addresses of those of the microinstructions marked with a "1" in the order in which microinstructions marked with "1" are executed. The above-mentioned information enables the tester to recognize through what paths the microprogram has been executed.

Figure 3:
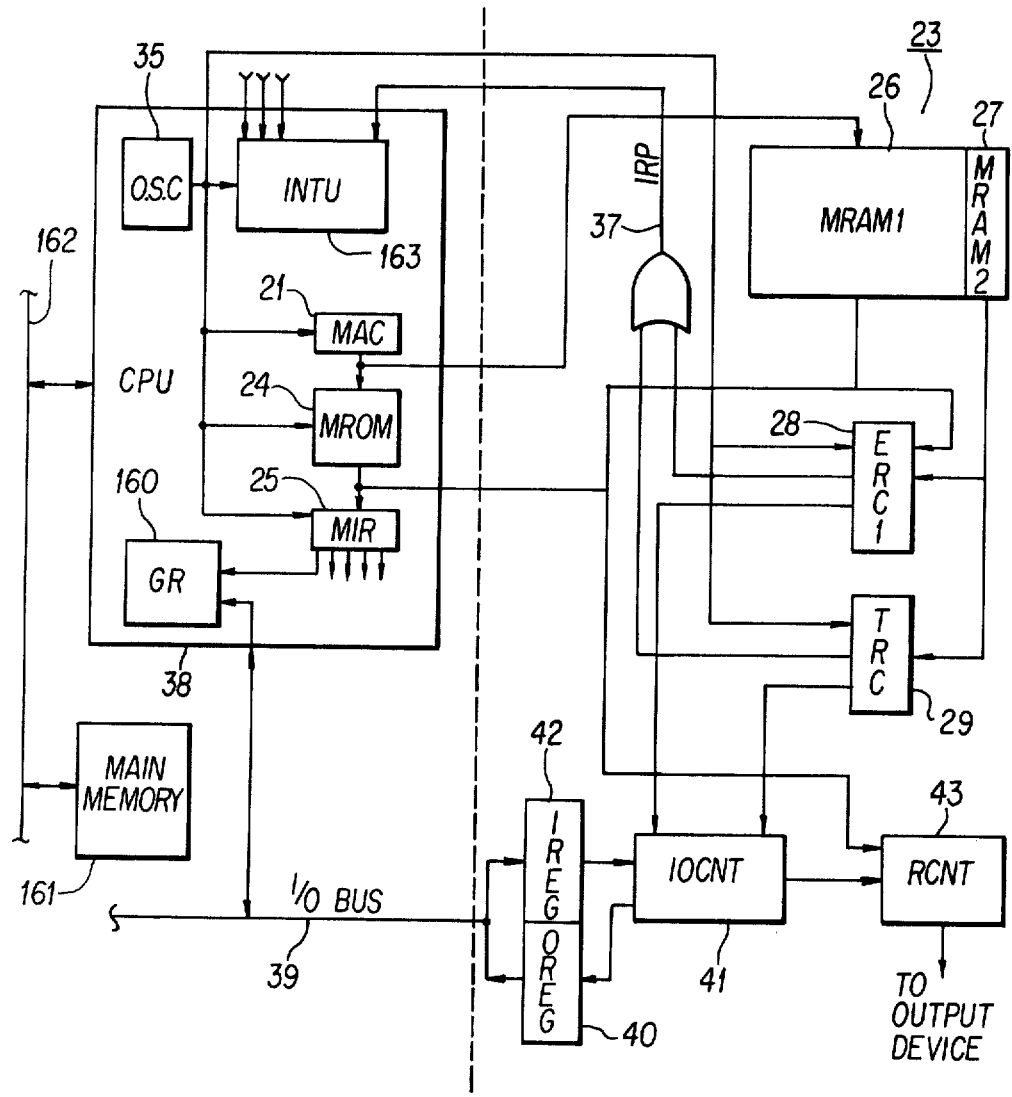
FIG. 3 is a block circuit diagram of a microprogram-testing apparatus according to another embodiment of the invention.

Description is given with reference to FIG. 4 of a system effecting the above-mentioned tracing function. The parts of FIG. 4 the same as those of FIGS. 2 and 3 are denoted by the same numerals, description thereof being omitted. The contents of the second section 27 of the first microprogram memory 23 defined by the address specified by the microaddress control unit (MAC) 21, data is supplied to the trace control circuit 29. If the data is "0", the trace control circuit 29 does not take any action. If the data is "1", then the trace control circuit 29 supplies an address stack (ASTK) 46 with a control signal (STKE) 47 for holding an address specified by the microaddress control unit 21. When an output from the second section 27 is "1" during the process through which a microprogram is successively executed, then all the corresponding addresses are held in the address stack (ASTK) 46 as in the above-mentioned operation. The read control circuit (RCNT) 43 read data stored in the address stack 46, that is, a microinstruction address to display to the tester. The above-mentioned address stack 46 is of a first in—first out type and capable of holding a plurality of data. Data first pushed in the address stack 46 is first popped out therefrom when the read control circuit 43 produces a read request. When said read control circuit 43 produces another read request, then the data written for the second time in the address stack 46 is read out. According to the above-mentioned function, by writing "1" in the second section 27 corresponding to a microinstruction to be tested, the operator can trace the log and detect errors, if any, after executing the microprogram.

Where the second section 27 of the first microprogram memory 23 has a word length of 2 bits, then the designation of the previously described breakpoint and the trace function can be effected in combination. In other words, it is possible to use one bit of the second section 27 for the designation of the breakpoint and another bit for the trace function.

Description is given with reference to FIG. 4 of a system for effecting such functions.

A function switching control circuit 30 selects the first microprogram memory 23 by feeding an enable signal 33 and enables the operation of the trace control circuit 29 by a control signal 47. The tester shall preliminary write a microprogram in the first section 26 of the first microprogram memory 23 and further "1" in the respective locations of the second section 27 correspond to the address at which the microinstruction should be halted and addresses at which the microinstructions should be traced. Where a microprogram is executed, the trace control circuit 29 monitors data read out of the second section 27. When the circuit 29 detects the trace bit with "1", it supplies the corresponding address to the address stack 46 for holding it. The read control circuit 43 read out the contents of the address stack 46, and displays the addresses in which the trace bit 1 "1". The trace control circuit 29 further monitors the condition of a breakpoint bit. If this breakpoint bit 1 "1", then the trace control circuit 29 turn the clock control signal 34 the system clock signal 36 to "0", thereby halting the execution of the microinstruction. At this time, the stack control signal (STKE) 47 is fed to the address stack 46 to hold an address related to the breakpoint. As in the case of tracing, the breakpoint address is displayed by the read control circuit 43. The tester checks the log through which the microprogram was executed and the address at which the execution of the microinstruction, thereby detecting errors, if any, occuring during the procedure of controlling the microprogram.

Where the second section 27 of the first microprogram memory 23 comprises 3 bits, then it is possible to effect the count function in addition to the aforesaid designation of the breakpoint and trace function. Description is given with reference to FIG. 5 of a system provided with such function. The parts of FIG. 5 the same as those of FIGS. 2 to 4 are denoted by the same numerals, description thereof being omitted.

The function switching control circuit 30 selects the first microprogram memory 23 by an enable signal 33, and further enables the operation of the trace control circuit 29 by a control signal 47. The tester preliminary writes a microprogram in the first microprogram memory 23 and further "1" in the corresponding address of microinstructions to be traced and in the corresponding address of the breakpoint. Where the second section 27 has a word length of 2 bits, then a microinstruction is executed in such a manner that when the address is reached at which the bit of the second section 27 1 "1", then the trace function or breakpoint function is carried out. In contrast where the second section 27 has a word length of 3 bits, then a number of times through which the execution of a microprogram has been repeated until the specified address is reached is counted by the additional bit. Where the count indicates a value designated by the tester, then the trace function or breakpoint function is carried out for the first time.

Description is now given of a combination of the above-mentioned trace function, breakpoint function and count function. Where a microprogram contains a certain portion whose execution should be repeated, then the contents of registers 160 and the memory 26 can be checked after the certain portion has been executed for a predetermined number of times. The tester preliminary writes "1" in the first position of the second section 27 correspond to the address at which the breakpoint in a loop should be specified. Further, a bit corresponding to the breakpoint and the third bit related to the designation of the contents of a counter are both arranged to have a logic level "1". At the same time, the write control circuit (WCNT) 51 causes a loop number specified by the tester to be supplied to the counter (CNTR) 52. Where data on a counter control bit line is logic "1", then the contents of the counter 52 is decreased by 1. The contents of the counter 52 are later successively decreased by 1, each time a microinstruction is read out of the corresponding address. Where the contents of the counter 52 are reduced to zero, then a control signal (BRW) 53 is supplied to the trace control circuit 29. This trace control circuit 29 produces a clock control signal (HALT) 34 which is derived from a logic sum of the data (having logic "1") on the breakpoint control bit line and the control signal (BRW) 53. In this case, the clock control signal (HALT) 34 may be replaced by interrupt request signal (IRP) 37. Further, it is possible to apply a logic sum of data on the trace control bit line and the control signal (BRW) 53. The above-mentioned alternative procedure is carried out by the control signal (TRCE) 47 delivered from the function switching control circuit 30. If, as previously described, a logic sum of two input signals have a logic level "1", then the control signal (STKE) 133 is supplied to the address stack 46 to hold the corresponding address. At this time, the read control circuit 43 displays the contents of the address stack 46.

Figure 6:
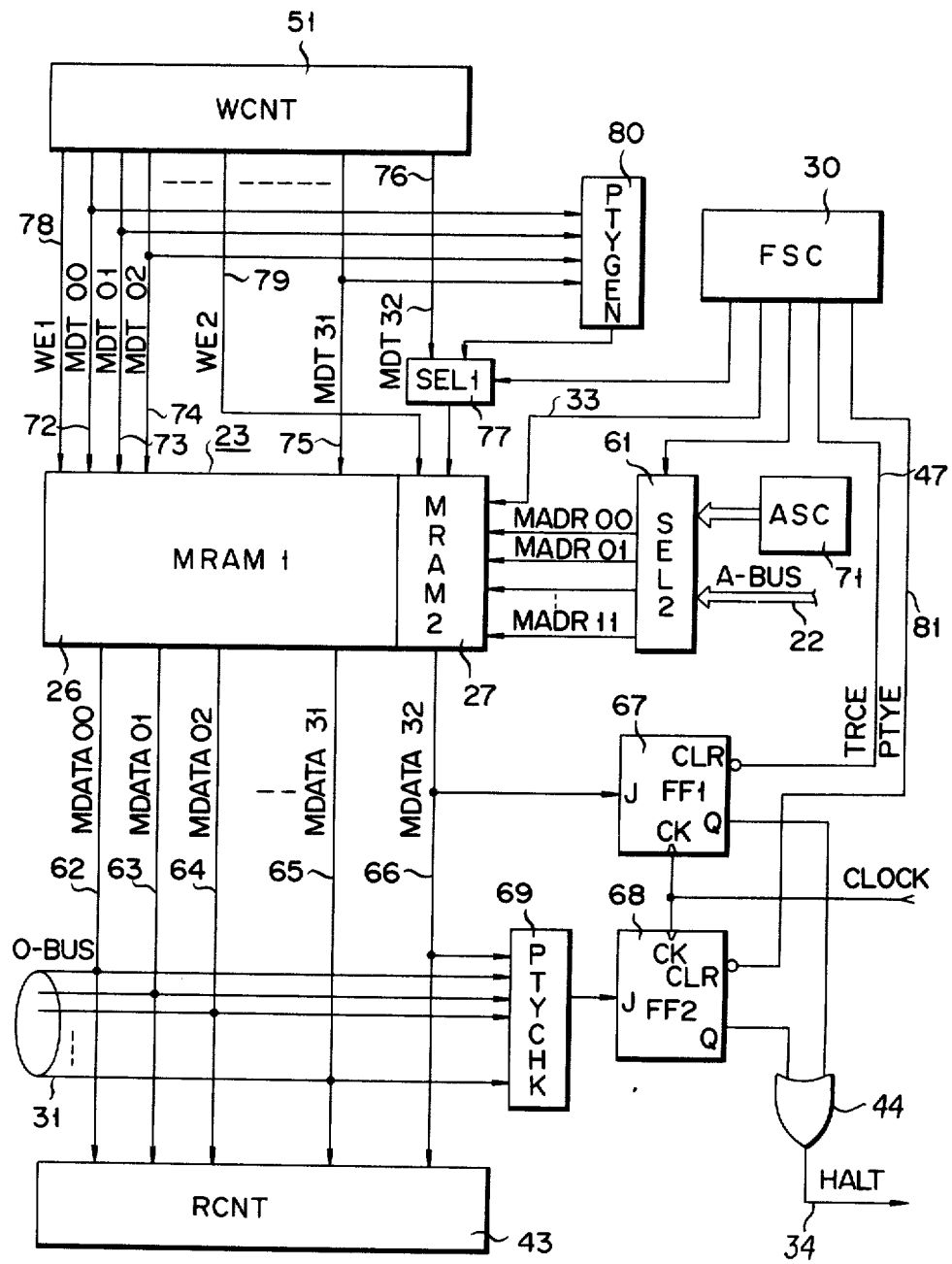
FIG. 6 is a block circut diagram of the section embodying the invention which specifies a microprogram address, showing the flow of data.

Description is now given with reference to FIG. 6 of a system in which data can be freely written in or read out of the first microprogram memory 23 used for test purposes. With the block circuit diagram of FIG. 6, the second section 27 of the first microprogram memory 23 has a word length of one bit. However, this invention is obviously applicable to the case where the second section 27 has a word length of a plurality of bits. The following four modes are available for use regarding the procedure of writing data in or reading it out of any optional address of the first microprogram memory 23.

Mode 1: data is written in the first section (MRAM1) 26 of the first microprogram memory 23

Mode 2: data is written in the second section (MRAM2) 27 of the memory 23

Mode 3: data is written in the first section (MRAM1) 26 and second section (MRAM2) 27

Mode 4: data is simultaneously read out of the first section (MRAM1) 26 and the second section (MRAM2) 27

Where, therefore, a microprogram written in the first microprogram memory 23 is being executed, then the mode 4 is applied. In this case, a signal denoting the address specified by the microaddress control unit 21 is supplied to the first and second sections 26, 27 at the same time through an output signal line (A-BUS) 22. At this time, the function switching control circuit 30 supplies the first microprogram 23 with the enable signal (MRAME) 33 for reading data from the memory 23, and also feeds a signal which specifies the output signal line (A-BUS) 22 as a source of an input signal to a selector (SEL2) 61. The contents of the specified address of the first microprogram memory 23 are conducted to microprogram memory output bus 62 to 66 at the same time after the access time of the memory 23.

Data on the microprogram memory output bus 62 to 65 are latched in the microinstruction register 25 included in the computer body to effect its control. Data on the output bus 66 is latched in a flip-flop circuit (FF1) 67 constituting part of the trace control circuit 29. Data on all the microprogram memory output bus 62 to 66 are supplied to a parity check circuit 69 constituting part of the error detector 28. When detecting a parity error, the parity check circuit 69 produces an output having logic "1", which is latched by a flip-flop circuit (FF2) 68. A logic sum of outputs from the flip-flop circuits 67, 68 is delivered to the clock generator 35 of the computer body as the clock control signal (HALT) 34. The case where the execution of a microprogram is stopped and the contents of the first microprogram memory 23 is read out also represents the mode 4. At this time, the function switching control circuit (FSC) 30 switches an input to the selector (SEL2) 61 to the signal from the microprogram address control circuit (ASC) 71 included in the test apparatus. The address specified by the tester is to the first microprogram memory 23 through the microprogram address control circuit (ASC) 71 and the selector 61. Data read out of the first microprogram memory 23 is supplied to the microprogram memory output bus 62 to 66.

Description is now given of the mode 1. Data to be written in the first section 26 of the first microprogram memory 23 is preliminary stored in the write control circuit 51. The address of the first section 26 in which the data is written is also stored in the microprogram address control circuit (ASC) 71. The function switching control circuit (FSC) 30 controls the selector 61 to select an output from the microprogram address control circuit 71. Under this condition, the write control circuit 51 feeds data to be written to microprogram write data bus 72 to 75 at the same time. When a write signal (WE1) 78 has a logic level "0", then the writing of data is brought to an end. In the mode 2, the designation of data writing, and the specification of an address are carried out in the same manner as in the mode 1. The selector 61 is in the same condition as in the mode 1. The function switching control circuit 30 controls the selector (SEL1) 77 to select an output from the write control circuit 51. Under this condition, the write control circuit 51 supplies data to be written to a microprogram write data bus (MDT32) 76. Where a write signal (WE2) 79 has a logic level "0", then the writing of data is brought to an end. At this time, the contents of the same address of the first section 26 of the first microprogram memory 23 as that of the second section 27 thereof remain unchanged.

Referring to the mode 3, a data on a microprogram write data bus (MDT32) 76 fed from the write control circuit 51 or a parity bit defined by a parity bit on microprogram write data buses 72 to 75 also delivered from the write control circuit 51 can be selected as a data to be written in the second section 27 of the first microprogram memory 23. The selection of the data on the microprogram write data bus (MDT32) 76 is effected by the simultaneous operation of both modes 1 and 2. In this case, it is advised to supply a data to microprogram write data bus (MDT00 to MDT32) 72 to 76, thereby letting write signals (WE1) 78 and (WE2) 79 have a logic level "0" at the same time. The selection of a data on the microprogram write data bus 72 to 75 is effected by writing the aforesaid error detecting data, namely, parity bit in the second section 27. In the latter case, the function switching control circuit 30 controls the selector (SEL1) 77 to select an output from a parity bit generator (PTYGEN) 80. Where, under the above-mentioned condition, the write control circuit 51 supplies a data to be written to the microprogram write data bus (MDT00 to MDT31) 72 to 75, then the parity bit generator 80 issues a parity bit on the basis of a data on the bus. The issued parity bit is fed to the second section 27 through the selector 77. When the write signals (WE1) 78 and (WE2) 79 have a logic level "0", then the writing of data is brought to an end.

The foregoing description refers to the case where a data is written in a single address. Obviously, data can be written in successive addresses specified by the address control circuit 71. The aforesaid four modes are applied as follows. Where an output from the parity bit generator 80 is supplied to the selector 77 in the mode 3, then a microprogram is written by attaching a parity bit to each microinstruction. Where the trace function and parity-detecting function are not applied, then the mode 1 is used. Where the trace function and breakpoint function are carried out, then an output from the write control circuit 51 is fed to the selector 77 in the modes 2 and 3. In this case, a microprogram to be tested is first written in the first section 26 of the microprogram memory 23 in the mode 3. All the bit positions of the second section 27 of the memory 23 are filled with "0". The tester supplies the microprogram address control circuit 71 with address which the breakpoint should be set or the addresses to be traced. Further, a data "1" is written in the second section 27 of the corresponding address in the mode 2. In this case, it is possible to arbitrarily define a number of breakpoints to be set and addresses to be traced. Where the breakpoint and tracing are released, it is advised to write "0" in the second sections 27 of the corresponding addresses. Where the counter function is applied, it is advised to write "0" in the second sections 27 of the corresponding addresses as described above.

In addition to the above described four modes, it is further possible to read out the contents of a second microprogram memory 26 of a computer body. This reading is undertaken when the computer body is loaded with a programmable memory or a read-only memory in which a microprogram is already written and which allows for the rewriting of the corrected microprogram. The output bus (O-BUS) 31 of the second microprogram memory 26 of the computer body is connected to the output terminal of the first microprogram memory 23 of the microprogram-testing apparatus. Therefore, it is possible to display the contents of that address of the second microprogram memory 26 which the microaddress control unit 21 has specified by the read control circuit 43 through the output bus (O-BUS) 31. Where the microprogram is executed each time an instruction is received, the above-mentioned procedure can be applied in checking a microinstruction. At this time, the function switching control circuit 30 produces the enable signal (MROME) 32 to enable data read from the second microprogram memory 26, and supplies the first microprogram memory 23 of the microprogram testing apparatus with a signal 33 for inhibiting an output from the memory 23. At this time, a trace control signal (TRCE) 47, and parity control signal (PTYE) 81 cooperate to inhibit the operations of the trace control circuit 29 and parity check circuit 69.

Description is now given with reference to FIG. 7 of a system, which, when the computer body is provided with a device for detecting an error in a microinstruction, can control the operation or nonoperation of the detecting device externally from the microprogram testing apparatus. The parts of FIG. 7 same as those of FIGS. 2 to 6 are denoted by the same numerals. First, a read-only memory in which a microprogram is stored is loaded to the computer body as a second microprogram memory 82. A microinstruction specified by the microaddress control unit 21 is read out of the second microprogram memory 82. The microinstruction thus read out is held in the microinstruction register 25 to control the computer body. Like the first microprogram memory 23 of the testing apparatus, the second microprogram memory 82 comprises two sections, that is, a first section 83 in which a microinstruction is stored and a second section 84 in which an error data is stored. Among the contents of the address of the second microprogram memory 82 which is specified by the microaddress control unit 21, the contents of the first section 83 of that specified address are held unchanged in the microinstruction register 25. At this time the contents of the first and second sections 83, 84 are fed to an error detector 85. This error detector, 85 judges whether a bit error has occurred or not. If no bit error arises, the error detector 85 allows a microprogram to be executed just as prepared. If a bit error is detected, the error detector 85 halts the execution.

Where the microprogram-testing apparatus is connected to the computer body and the second microprogram memory 82 is not used, then it is necessary to suppress the contention of outputs from both microprogram memories 23, 82. Therefore, the function switching control circuit 30 feeds a signal (MROME) 32 to inhibit the output of the second microprogram memory 82. Thus, the contents of that address of the first microprogram memory 23 specified by the microaddress control unit 21 are loaded in the microinstruction register 25 through the output bus (O-BUS) 31. At this time, the error detector (ERC2) 85 is not supplied with data on the detection of error. Therefore, a microinstruction read out is considered to include a bit error, and is inhibited from being executed. To avoid such event, the function switching control circuit 30 supplies the error detector 85 with a signal (ERCE) 86 for inhibiting its operation. As a result, the error detector 85 has its operation inhibited only when a test is made of a microprogram written in the microprogram memory 23. Where a microprogram written in the second microprogram memory 82 is executed, then the function switching control circuit 30 allows the error detector 85 to be operated upon receipt of a control signal 86. Where the microprogram-testing apparatus is taken off the computer body, then the error detector 85 is enabled.

Figure 8:
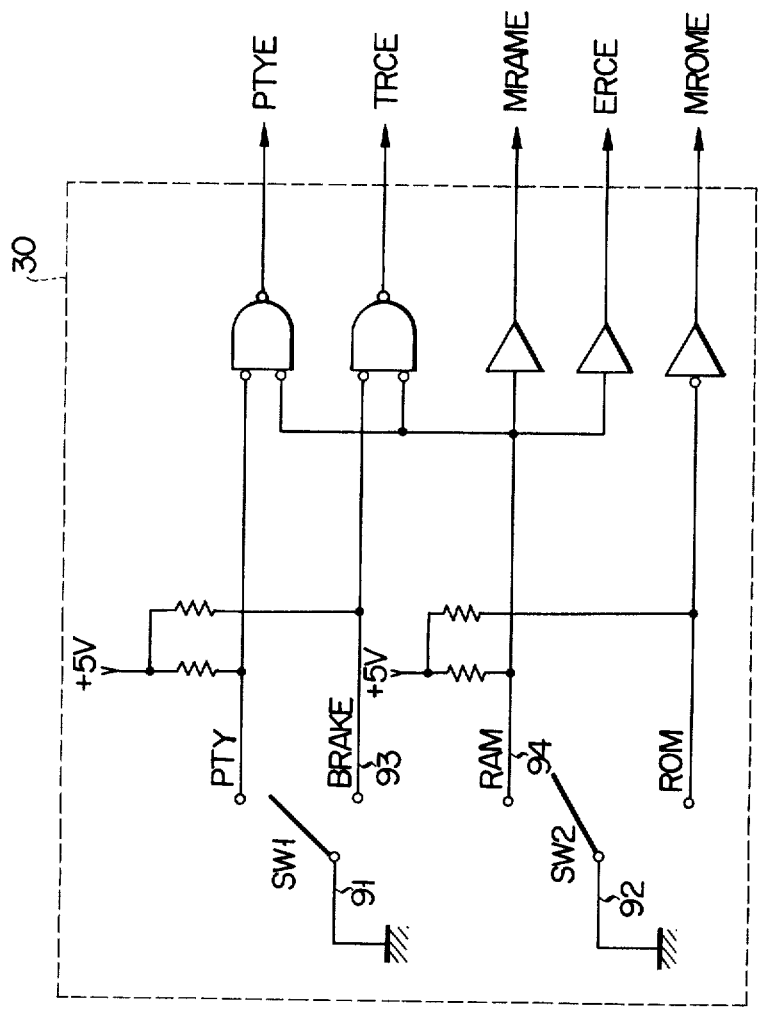
FIG. 8 shows the detailed arrangement of a circuit for controlling the changeover of the various functions of the microprogram-testing apparatus of the invention.

Description is now given with reference to FIG. 8 of the operation of the function switching control circuit 30, in case the second section (MRAM2) 27 of the first microprogram memory 23 has a word length of one bit. A switch (SW1) 91 is a unit for selecting which of the error detectors (ERC1) 28 or (ERC2) 85 and trace control circuit (TRC) 29 should be enabled. A switch (SW2) 92 selects whether data is to be read out of the first microprogram memory (MRAM) 23 or second microprogram memory (MROM) 24, and further whether the error detector (ERC2) 85 should be enabled. Where the second section (MRAM2) 27 is used as a breakpoint, then the switch (SW1) 91 is connected to a breakpoint (BRAKE) 93. The switch (SW2) 92 is connected to a random access memory (RAM) 94. Under this condition, a signal (TRCE) 47 for enabling the trace control circuit 29 and a signal (MRAME) 33 for allowing data to be read out of the first microprogram memory (MRAM) 23 are both set at a logic level "0". The other signals (PTYE) 81, (ERCE) 86 and (MROME) 32 are all set at a logic level "1", thereby disabling the corresponding circuits. While capable of being fabricated from a combination of the switches and gates as described above, the function switching control circuit 30 may be controlled by a microprocessor to attain a higher function.

Figure 9:
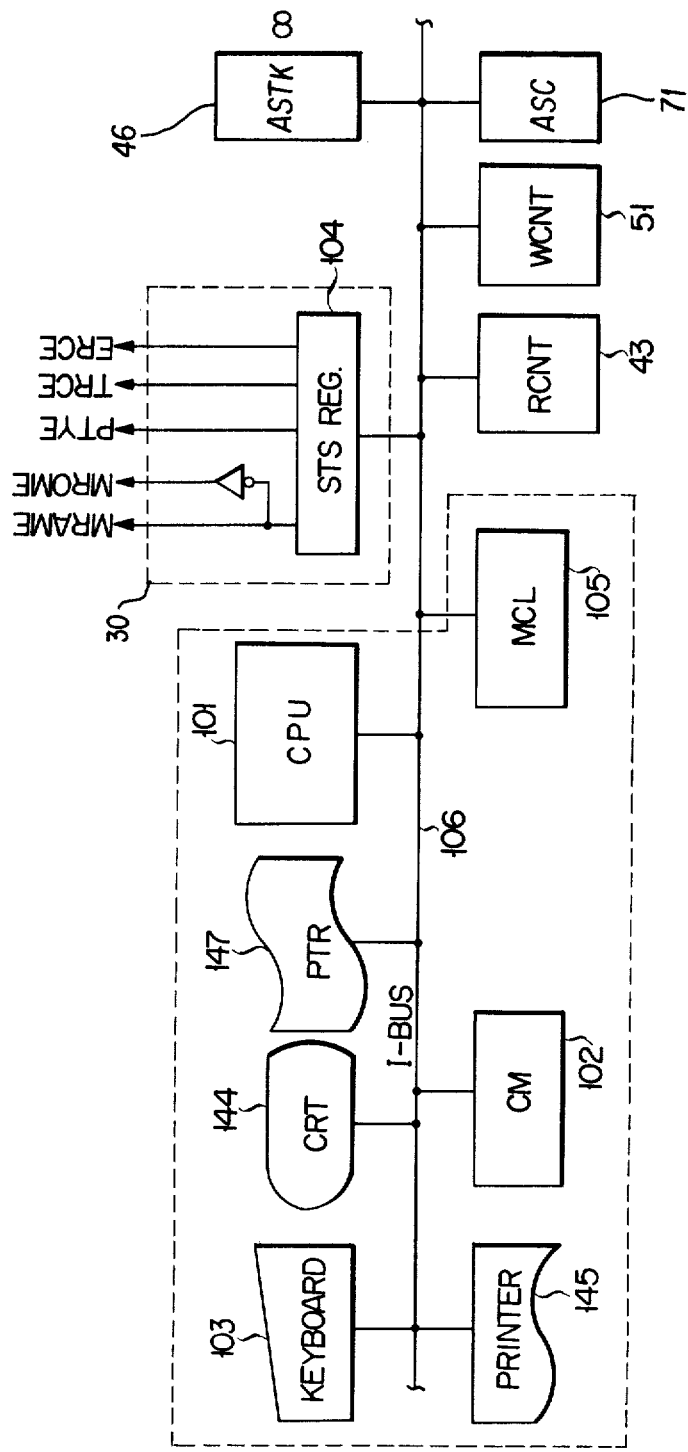
FIG. 9 is a block circuit diagram of a concrete microprogram-testing apparatus embodying this invention.

Description is now given with reference to FIG. 9 of the operation of the function switching control circuit 30 controlled by a microprocessor. The central portion of the function switching control circuit 30 comprises a microprocessor (CPU) 101 and a memory (CM) 102 used with the (CPU) 101. Where the tester supplies the microprocessor (CPU) 101 with a function-specifying code from a keyboard (KEYBOARD) 103, then the microprocessor (CPU) 101 decodes a code supplied in accordance with a keyboard input program stored in the memory (CM) 102 and writes a predetermined value in a function-holding register (STSREG) 104 included in the function switching control circuit 30. The contents of function-holding register 104 are output in the form of, for example, a signal (PYTE) 81, (TRCE) 47 and so on.

Figure 10:
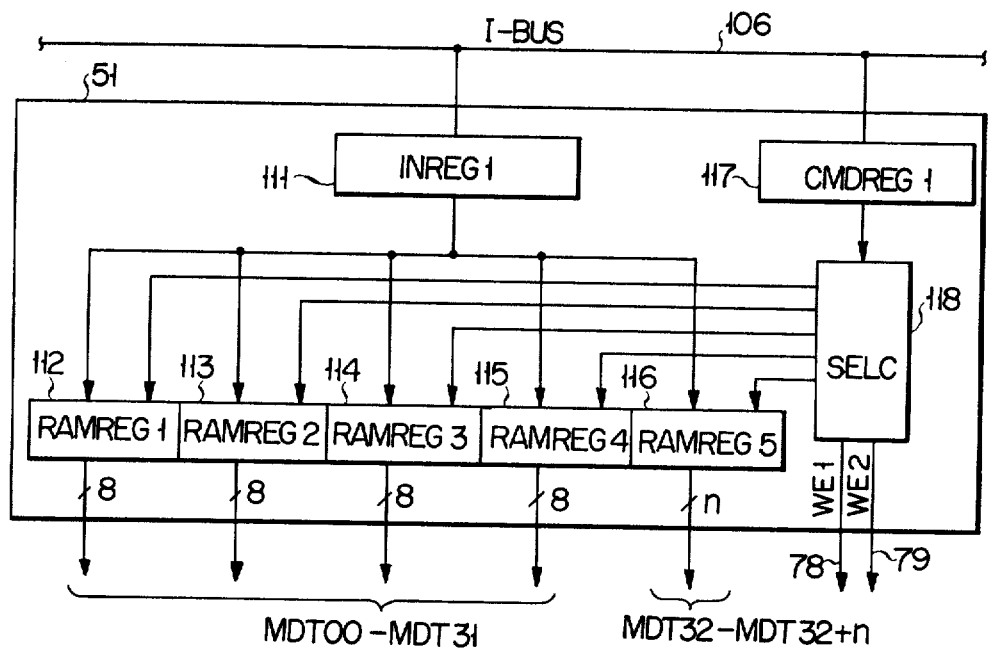
FIG. 10 is a detailed block circuit diagram of a write-controlling circuit.

Description is now given with reference to FIG. 10 of the operation of the write control circuit (WCNT) 51. Data to be written in the first microprogram memory (MRAM) 23 is fed from the microprocessor (CPU) 101 shown in FIG. 9 to the write control circuit 51 through an internal bus (I-BUS) 106. A data carried through the internal bus (I-BUS) 106 has a word length of 8 bits. On the other hand, the word length of the first microprogram memory (MRAM) 23 is generally greater than the word length of the internal bus (I-BUS) 106. In the foregoing embodiment, the word length of the first section (MRAM1) 26 is formed of 32 bits. Therefore, data to be written in the first section (MRAM1) 26 is supplied in the form of four divisions (32/8=4). These four divided pieces of data are respectively held through an input register (INREG1) 111 in data-holding registers (RAMREG1) 112, (RAMREG2) 113, (RAMREG3) 114 and (RAMREG4) 115.

The selection of any of these data-holding registers is effected by the joint action of a command-holding register (CMDREG1) 117 and write mode selection circuit (SELC) 118. The microprocessor (CPU) 101 first produces through the internal bus (I-BUS) 106 commands to be written in the data-holding registers (RAMREG1) 112 to (RAMREG4) 115 to the command-holding register (CMDREG1) 117, and thereafter produces data to be written therein. The microprocessor (CPU) 101 produces data to be written in the first section (MRAM1) 26 in four divisions to all the data-holding registers (RAMREG1) 112 to (RAMREG4) 115. The subsequent operation varies with the form of test data to be written in the second section (MRAM2) 27. Where a parity check is selected in the function switching control circuit 30, and the microprocessor (CPU) 101 produces write commands from the first and second sections to the command-holding register (CMDREG1) 117 through the internal bus (I-BUS) 106, then the write mode selection circuit (SELC) 118 feeds write-enabling instruction (WE1) 78, (WE2) 79 to the first microprogram memory (MRAM) 23. The contents of the data-holding registers (RAMREG1) 112 to (RAMREG4) 115 are supplied just as stored, as seen from FIG. 6, to the first section (MRAM1) 26, and written in the section 26 in a timing defined by an address-enabling signal (WE1) 78. At this time the contents of the data-holding registers (RAMREG1) 112 to (RAMREG4) 115 are conducted to the parity bit generator (PTYGEN) 80 (FIG. 6). A parity bit produced by the generator 80 is written through the selector (SEL1) 77 in the same address of the second section (MRAM2) 27 as that of the first section (MRAM1) 26 in a timing defined by the write-enabling signal (WE2) 79.

Description is now given of the case where tracing or breakpoint is selected in the function switching control circuit 30.

The microprocessor (CPU) 101 supplies write data to the data-holding registers (RAMREG1) 112 to (RAMREG4) 115, and thereafter causes trace or breakpoint data to be written in the data-holding register (RAMREG5) 116 used for the second section (MRAM2) 27. Where the trace or breakpoint data has a logic level "1", then microinstruction held in the data-holding registers (RAMREG1) 112 to (RAMREG4) 115 is intended for the application of trace or breakpoint. Where the microprocessor (CPU) 101 supplies the command-holding register (CMDREG1) 117 with a command instructing the writing of data in the first and second sections, then the write mode selection circuit (SELC) 118 feeds write-enabling signals (WE1) 78, (WE2) 79 to the first microprogram memory (MRAM) 23. The contents of the data-holding registers (RAMREG1) 112 to (RAMREG5) 116 are fed, as seen from FIG. 6, to the first section (MRAM1) 26 and second section (MRAM2) 27, and written in the addresses specified by the microprogram address control circuit (ASC) 71 in a timing defined by address-enabling signal (WE1) 78, (WE2) 79.

The above-mentioned two writing procedures represents the previously described mode 3, in which data is written in and read out of the first microprogram memory (MRAM) 23.

Further description is given of the operation of the write control circuit (WCNT) 51 in the modes 1 and 2. In the mode 1, the microprocessor (CPU) 101 feeds, just as stored, the contents of the data-holding registers (RAMREG1) 112 to (RAMREG4) 115 to the first section (MRAM1) 26 and written therein in a timing defined by the write-enabling signal (WE1) 78. At this time, the contents of the same address of the second section (MRAM2) 27 as that of the first section (MRAM1) 26 remain unchanged. In the mode 2, the microprocessor (CPU) 101 supplies test data only to the data-holding register (RAMREG5) 116, and then a second section write command to the command-holding register (CMDREG1) 117. The write mode selection circuit (SELC) 118 produces only a write-enabling signal (WE2) 79 for the second section (MRAM2) 27. The contents of the data-holding register (RAMREG5) 116 is fed, just as stored, to the second section (MRAM2) 27 and written therein in a timing defined by the write-enabling signal (WE2) 79. At this time, the contents of the same address of the first section (MRAM1) 26 as that of the second section (MRAM2) 27 remain unchanged.

Figure 11:
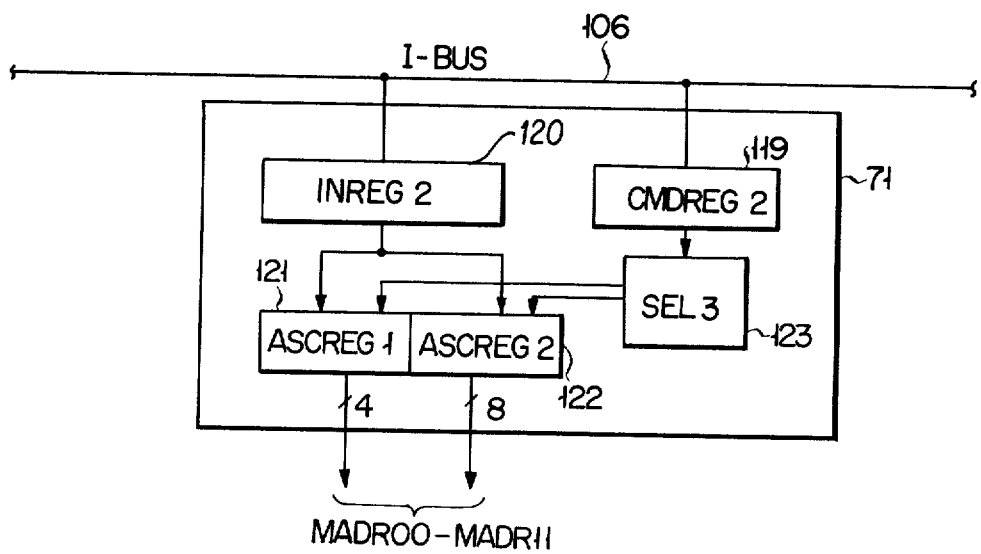
FIG. 11 is a detailed block circuit diagram of a microprogram address control circuit.

Description is now given of the microprogram address control circuit (ASC) 71 which has a construction, as seen from FIG. 11, similar to that of the write control circuit (WCNT) 51. This microprogram address control circuit (ASC) 71 holds a microprogram address of 12 bits in address-holding registers (ASCREG1) 121, (ASCREG2) 122. To the command-holding register (CMDREG2) 119 supplied is a command from the microprocessor (CPU) 101. A control signal is produced through the selector (SEL3) 123 to determine which of the address registers (ASCREG1) 121 and (ASCREG2) 122 should be used in accordance with a value indicated by the above-mentioned command from the microprocessor (CPU) 101.

Figure 5:
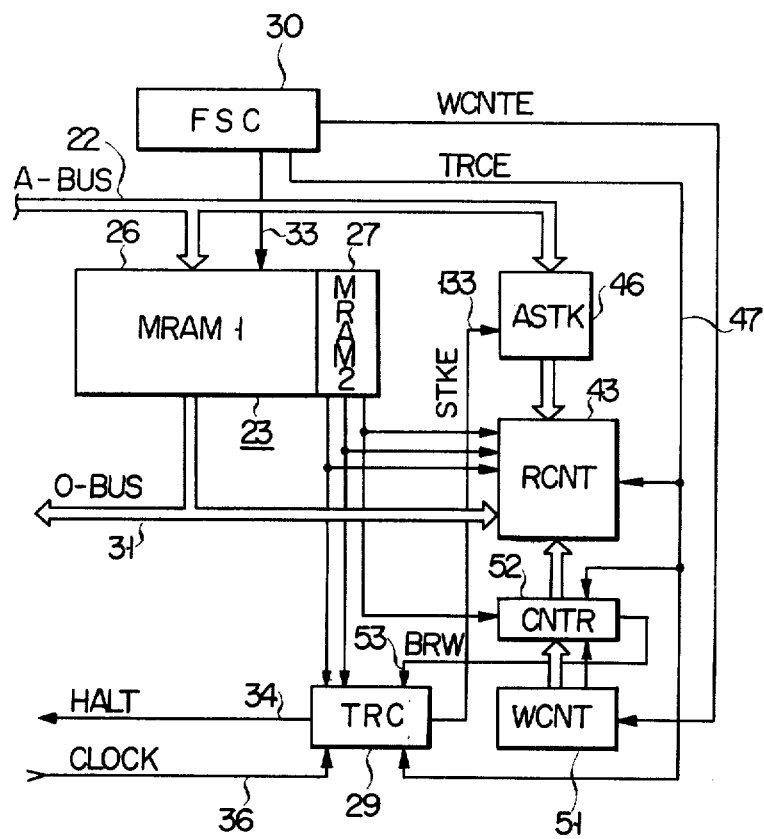
FIG. 5 is a block circuit diagram of a microprogram-testing apparatus according to a further embodiment of the invention.
Figure 12:
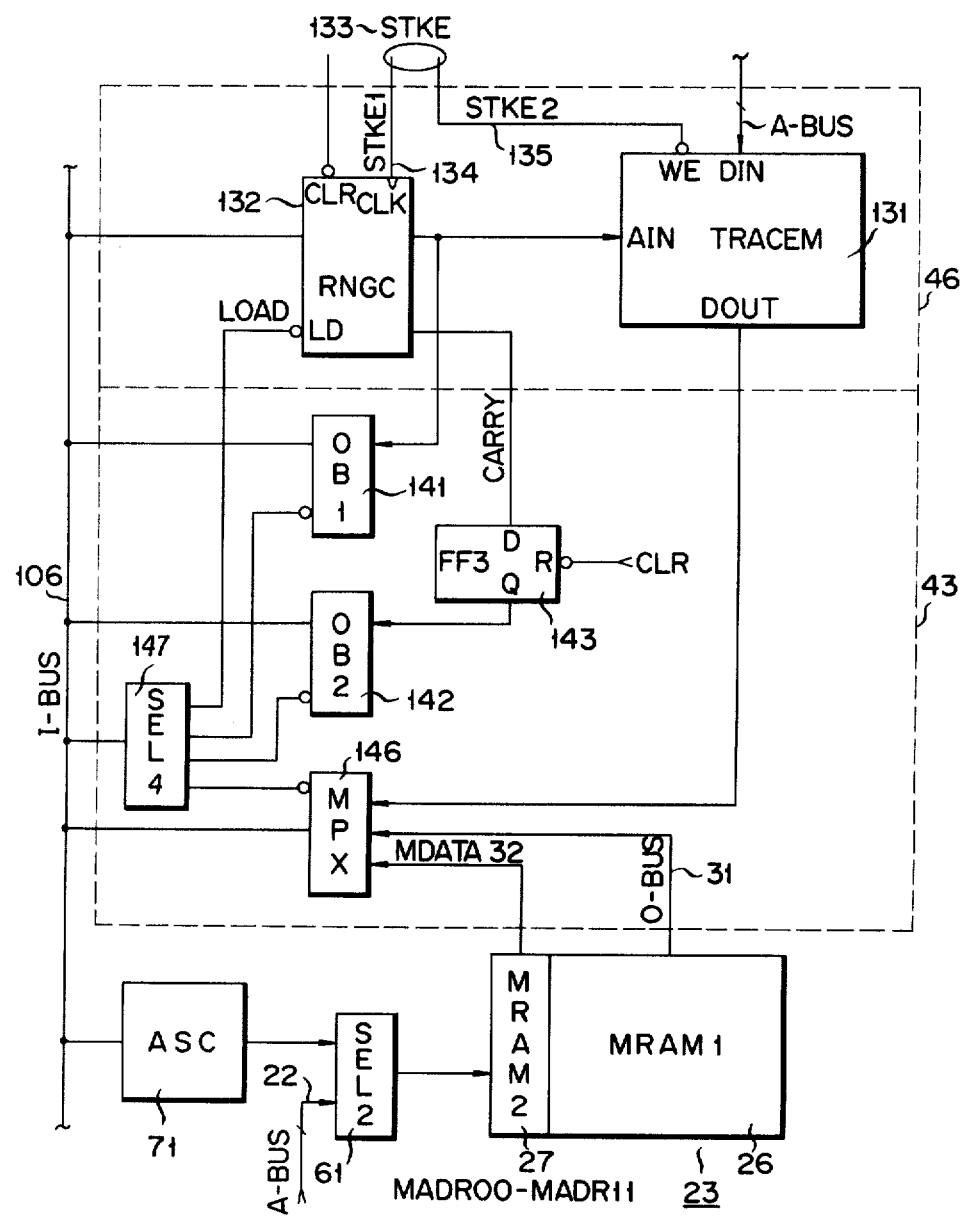
FIG. 12 is a detailed block circuit diagram of a read control circuit 13F and address stack.
Figure 13:
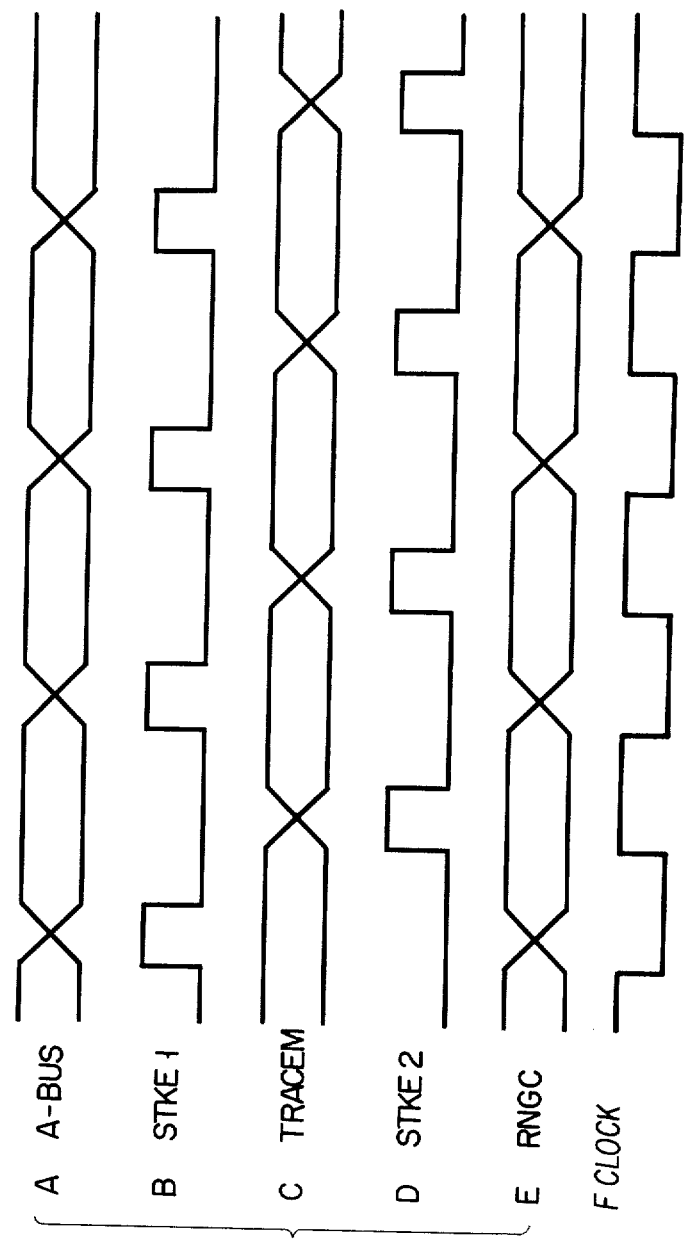
FIGS. 13A to 13F are timing charts respectively showing the operations of an address bus (A-BUS), a first stack-enabling signal (STKE1), trace memory (TRACEM), second stack-enabling signal (STKE2), trace address counter (RNGC), and clock
Figure 14:
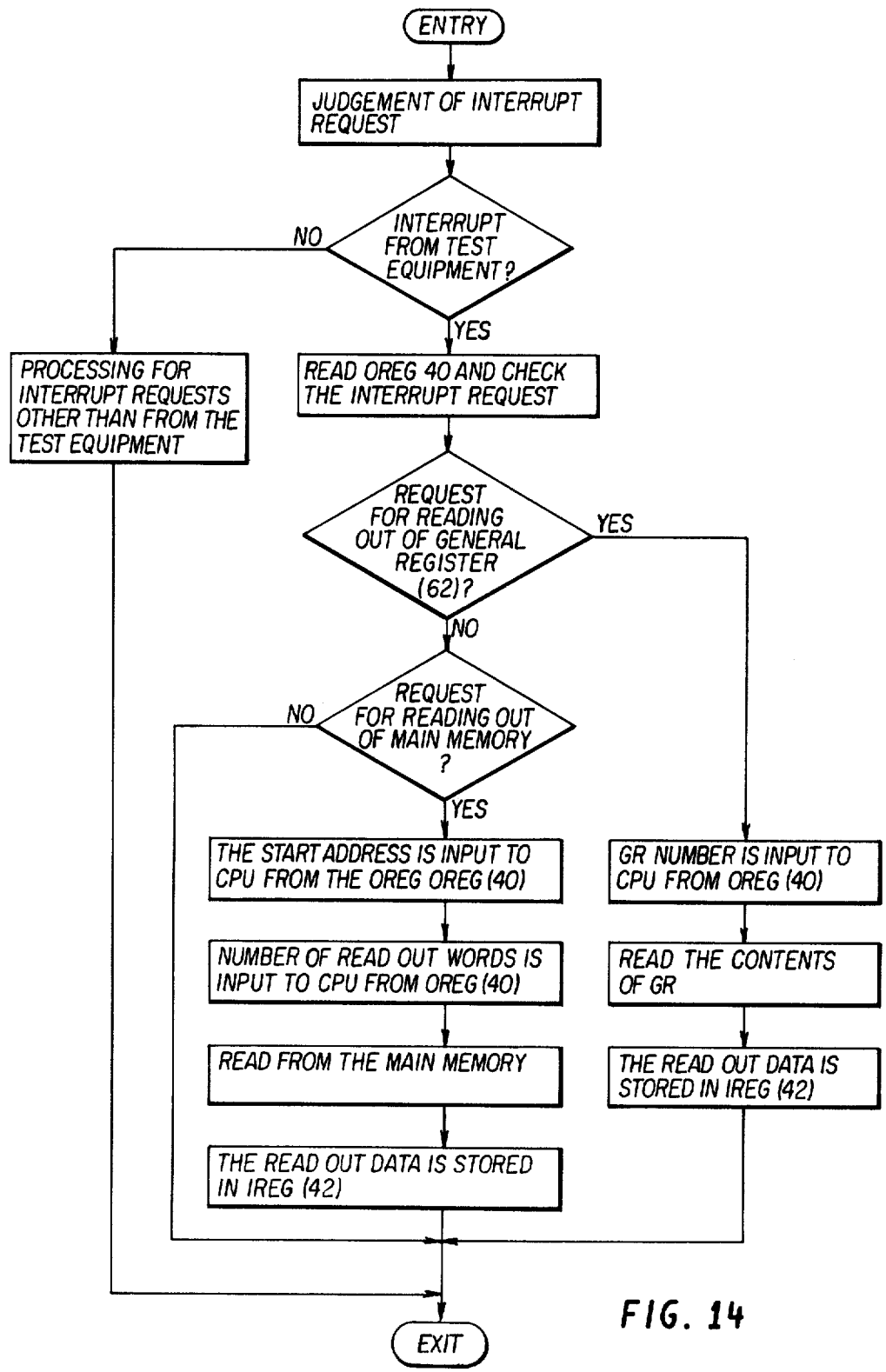
FIG. 14 is a flow chart of an interruption processing microprogram.
Figure 15:
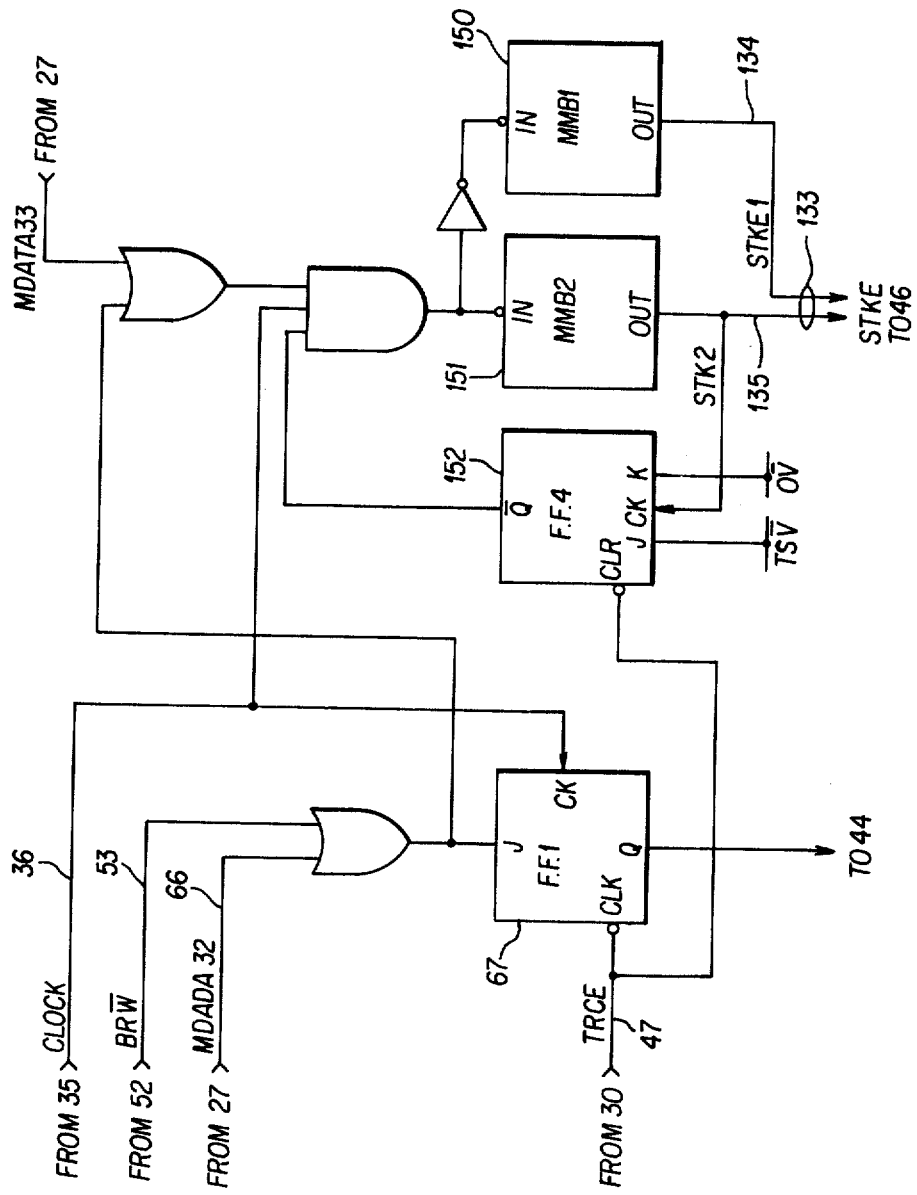
FIG. 15 is a detailed circuit diagram of a trace control circuit.

Description is now given with reference to FIGS. 12 and 13 of the operation of the address stack (ASTK) 46 and read control circuit (RCNT) 43. The address stack (ASTK) 46 is formed of a trace memory (TRACEM) 131 for storing microprogram addresses whose trace bit is logic "1" and a trace address counter (RNGC) 132 for specifying any of the addresses stored in the trace memory (TRACEM) 131. The microprocessor (CPU) 101 writes an initial value in a trace address counter (RNGC) 132 through the internal bus (I-BUS) 106. Where a microprogram to be tested is executed and a signal having a logic level "1" is read out of the second section (MRAM2) 27 as shown in FIG. 5, in other words, a trace instruction is output, then the trace control circuit (TRC) 29 produces a stack-enabling signal (STKE) 133. At this time, data on the address of the first microprogram memory (MRAM) 23 from which a microinstruction has been read out is already fed to the address bus (A-BUS) 22. The address data is written in that address of the trace memory (TRACEM) 131 which is indicated by the trace address counter (RNGC) 132 in a timing defined by one stack-enabling signal (STKE2) 135 included in the stack-enabling signals (STKE) 133 (see FIGS. 13C and 13D). Upon completion of writing, another stack-enabling signal (STKE1) 134 included in the stack-enabling signals (STKE) 133 increases the contents of the trace address counter (RNGC) 132 by 1 (see FIGS. 13B and 13E). Where a trace instruction is produced a second time, the above-mentioned procedure is also followed. Thus, data on trace-instructing addresses are successively stored in the addresses indicated by the trace address counter (RNGC) 132. Where a trace instruction is stored in all the addresses of the trace memory (TRACEM) 131 and later a further trace instruction is produced, then overflow arises in the contents of the trace address counter (RNGC) 132, turning a flip-flop circuit (FF3) 143 on. At this time, the contents of the trace address counter (RNGC) 132 are reduced to zero, and overlay is started with the zero address of the trace memory (TRACEM) 131, erasing the old data. Where the trace memory (TRACEM) 131 has a capacity of 256 words, then it is possible to store 256 trace instruction address data at maximum as counted from the microprogram address which has received the last trace instruction.

Description is now given with reference to FIG. 12 of the operation of the read control circuit (RCNT) 43. Reference is first made to the case where the contents of the trace memory (TRACEM) 131 are read out. In this case, the microprocessor (CPU) 101 effects reading through the internal bus (I-BUS) 106 and output buffers (OB1) 141, (OB2) 142. The contents of the trace address counter (RNGC) 132 are read out of the output buffer (OB1) 141. Data denoting the condition of a flip-flop circuit (FF3) 143 is read out of the output buffer (OB2) 142. Where an output from the flip-flop circuit (FF3) 143 has a logic level "0", then it is shown that data on the microprogram addresses to which a trace instruction has been issued are stored in the addresses of the trace memory (TRACEM) 131 extending from the zero address to the address whose sequential position is denoted by a number decreased by 1 from the last contents of the trace address counter (RNGC) 132.

Where an output from the flip-flop circuit (FF3) 143 has a logic level "1", then it is shown that data on the microprogram addresses to which a trace instruction has been issued are stored in the addresses of the trace memory (TRACEM) 131 extending from the address indicated by the contents of the trace counter (RNGC) 132 to the address whose sequential position is denoted by a number decreased by 1 from the last contents of the trace address counter (RNGC) 132. Where data are to be stored in more addresses than the capacity of the trace memory (TRACEM) 131, then data which are to be stored in the excess number of addresses are stored in the addresses of the trace memory (TRACEM) 131, starting with the zero address thereof. In other words, the excess data are overlaid on past of the data which are already stored in the prescribed number of addresses of the trace memory TRACEM) 131. The new data are stored in the addresses extending from the zero address of the trace memory (TRACEM) 131 to the address whose sequential position is denoted by a number decreased by 1 from the current contents of the (RNGC) 132. Depending on the condition of the flip-flop circuit (FF3) 143, the microprocessor (CPU) 101 causes the contents of the trace memory (TRACEM) 131 to be read out through an output multiplexer 146 and internal bus (I-BUS) 106. All the data thus read out are fed to a display unit (CRT) 144 or printer 145 shown in FIG. 9. The read control circuit (RCNT) 43 enables the contents of the first microprogram memory (MRAM) 23 to be read out. The microprocessor (CPU) 101 reads out address data to the address control circuit (ASC) 71 through the internal bus (I-BUS) 106. Data on the address indicated by the address control circuit (ASC) 71 is supplied to the first microprogram memory (MRAM) 23 through the selector (SEL) 61. The contents of the corresponding address of the first microprogram memory (MRAM) 23 are read out. Data thus read out is fed to the internal bus (I-BUS) 106 in the unit of 8 bits by the action of an output multiplexer 146. The multiprocessor (CPU) 101 fetches in the form divided into equal parts the contents of those locations of the first microprogram memory (MRAM) 23 which are specified by address data fed to the address control circuit (ASC) 71. An output from the microprocessor (CPU) 101 is fed to the display unit (CRT) 144 or printer 145 shown in FIG. 9. All the above-mentioned operations of the microprocessor (CPU) 101 follow a program already written in the memory (CM) 102.

Description is now given of the manner in which a microprogram testing apparatus embodying this invention is applied.

Reference is first made to the procedure of applying the apparatus with a parity bit written as test data in the second section (MRAM2) 27.

(1) A keyboard 103 is operated to supply a code for specifying the second section (MRAM) 27 as that in which a parity bit is written. The function switching control circuit 30 sends forth a control signal required for the parity check mode.

(2) A microprogram written on a paper tape is read out through a paper tape reader (PTR) 147 (FIG. 9). The microprocessor (CPU) 101 causes data thus fetched to be supplied to the written control circuit (WCNT) 51 and microprogram address control circuit (ASC) 71 through the internal bus (I-BUS) 106.

(3) Data delivered from the microprocessor (CPU) 101 is written in the first section (MRAM1) 26 by the joint action of the write control circuit (WCNT) 51 and microprogram address control circuit (ASC) 71. At this time a parity bit is written in the second section (MRAM2) 27.

(4) A microprogram written in the first section (MRAM1) 26 is executed. Where, at this time, a parity error occurs, then the generation of clock pulses is stopped by the error detector (ERC1) 28. The execution of a microprogram is interrupted at the address in which the parity error has occurred.

(5) The read control circuit (RCNT) 43 fetches data fed from the microaddress control unit (MAC) 21 to the address bus (A-BUS) 22 and data fed from the first microprogram memory (MRAM) 23 to the output bus (O-BUS) 31. Both data are indicated on the display unit (CRT) 144. The items displayed in this case are data on the addresss in which a parity error has occurred and a microinstruction corresponding to fed address.

Description is now given of the procedure of writing a breakpoint as a test data in the second section (MRAM2) 27.

(1) The keyboard 103 is operated to supply a code for specifying the second section (MRAM2) 27 as that which is used as a breakpoint. The function switching control circuit 30 feeds a control signal required for the breakpoint mode.

(2) A microprogram written on a paper tape is read out through the paper tape reader (PTR) 147. The microprocessor (CPU) 101 supplies fetched data to the write control circuit (WCNT) 51 and microprogram control circuit (ASC) 71 through the internal bus (I-BUS) 106.

(3) Data supplied from the microprocessor (CPU) 101 is written in the first section (MRAM1) 26 by the joint action of the write control circuit (WCNT) 51 and microprogram address control circuit (ASC) 71. The second section (MRAM2) 27 is set at a logic level "0".

(4) The tester operates the keyboard 103 to supply data on the address of a microprogram to be tested with which the execution of the microprogram should terminate. The microprocessor (CPU) 101 causes the second section (MRAM2) 27 to be set at a logic level "1" in the mode 2. Where it is desired to institute a plurality of breakpoints then the above-mentioned procedure is repeated.

(5) A microprogram written in the first section (MRAM1) 26 is executed. Where, in this case, the first section (MRAM1) 26 is specified as a breakpoint, then the trace control circuit (TRC) 29 stops the clock pulse and interrupts the execution of a microprogram before the commencement of a microinstruction corresponding to an address specified as a breakpoint. At this time, the address stack (ASTK) 46 stores the address specified as a breakpoint in the trace memory (TRACEM) 131.

(6) The microprocessor (CPU) 101 fetches the contents of the trace memory (TRACEM) 131 through the read control circuit (RCNT) 43 for indication on the display unit (CRT) 144. In this case, an address specified as a breakpoint and a microinstruction corresponding to the address are displayed.

(7) When the execution of a microprogram is interrupted at the address thus displayed, the tester sets the following breakpoint through a procedure the same as that of the above procedure (4).

(8) The execution of a microprogram is started with the address displayed in the above procedure (6). Where the function switching control circuit 30 produces a trace-enabling signal (TRCE) 47 to the trace control circuit (TRC) 29, then the flip-flop circuit (FF1) 67 is reset, causing a clock pulse to be generated.

Description is now given of the procedure of writing a breakpoint and trace bit as test data in the secod section (MRAM2) 27.

(1) The keyboard 103 is operated to supply a code for specifying the second section (MRAM2) as that which is used as a breakpoint and in which a trace bit is written. The function switching control circuit 30 supplies forth a control signal required for the breakpoint mode and trace mode.

(2) A microprogram written on a paper tape is read out through the paper tape reader (PTR) 147. The microprocessor (CPU) 101 supplies the data thus fetched to the write control circuit (WCNT) 51 and microprogram address control circuit (ASC) 71.

(3) Data fed from the microprocessor (CPU) 101 is written in the first section (MRAM1) 26 by the joint action of the write control circuit (WCNT) 51 and microprogram address control circuit (ASC) 71. The second section (MRAM2) 27 is set at a logic level "0".

(4) The tester operates the keyboard 103 to supply data on the address with which the execution of a microprogram should terminate. The addresses which should be traced are specified by a microinstruction executed before the address is reached with which the execution of a microprogram should terminate. Where each microinstruction is specified to carry out the tracing function, then it is possible to recognize all the microinstruction which have been executed. Where a branch microinstruction alone is specified to carry out the tracing function, then it is possible to easily recognize the route through which a microprogram is executed, and reduce a number of addresses whose tracing is to be specified.

(5) A microprogram written in the first section (MRAM1) 26 is executed. At this time, the address whose tracing is specified is stored in the trace memory (TRACEM) 131 by the joint action of the trace control circuit (TRC) 29 and address stack (ASTAK) 46. Where the address is reached which is specified as a breakpoint, then a clock pulse ceases to be issued by the action of the trace control circuit (TRC) 29. The execution of the microprogram written in the first section (MRAM1) 26 is interrupted, before a microinstruction corresponding to the address specified as a breakpoint begins to be executed. At this time, the address stack (ASTAK) 46 causes the corresponding address to be stored in the trace memory (TRACEM) 131.

(6) The microprocessor (CPU) 101 reads out all the contents of the trace memory (TRACEM) 131 through the read control circuit (RCNT) 43. Data thus read out is indicated on the display unit (CRT) 144. In this case, the items indicated on the display unit (CRT) 144 are the address whose tracing is specified, the address specified as a breakpoint and the microinstruction corresponding the address specified as a breakpoint.

INDUSTRIAL APPLICABILITY

The microprogram-testing apparatus of this invention is particularly effective to develop a microprogram for a microprogram controlled computer in which a microprogram is stored in a read only memory (ROM) or programmable read only memory (PROM).

What is claimed is:

1. An apparatus for testing a microprogram used with a microprogram type electronic computer, which comprises:
a memory (23) formed of a first section in which a plurality of microinstructions for controlling the operation of the electronic computer are stored and a second section in which there are stored at least one of data for the detection of an error in the microinstructions and data for controlling the halt of the execution of said microinstructions;
an error detector (28), which, when data for the detection of an error is written in the second section, detects an error in the microinstructions stored in the first section of said memory (23) according to said error detection data;
a trace control circuit (29), which, when data for controlling the halt of the execution of a microprogram is stored in the second section of said memory (23), halts the execution of the microinstructions stored in the first section of said memory (23) according to said data;
a function switching control circuit (30) for deciding the selective use of said memory (23) and a microprogram memory used with a microprogram, and also the selective use of said error detector (28) and trace control circuit (29); and
a read control circuit (43) for reading the contents of said memory (23).

2. An apparatus for testing a microprogram used with a microprogram type electronic computer, which comprises:
a memory (23) formed of a first section in which a plurality of microinstructions for controlling the operation of the electronic computer stored and a second section in which there are stored at least one of data for the detection of an error in the microinstructions and data for controlling the halt of the execution of said microinstructions;
an input-output control circuit (41) specifying the addresses of the general register of main memory of the electronic computer from which data is to be read out;
an output register (40) in which the addresses of said general register or main memory is to be written;
an input register (42) in which the contents of said general register or those of said main memory defined by a central processing unit of the electronic computer are written according to the contents stored in said output register;
a read control circuit (43) for reading the contents of said memory (23) or fetching the contents of said input register (42) and causing said contents to be indicated on a display unit;
a trace control circuit (29), which, when data for controlling the execution of a micoprogram is stored in the second section of said memory (23), halts the execution of the microinstructions stored in the first section of said memory (23) according to said data; and
a function switching control circuit (30) for deciding the selective use of said memory (23) and a microprogram memory used with a microprogram.

3. An electronic computer having a micoprogram memory (82) formed of a first section for storing a plurality of microinstructions and a second section for storing data for the detection of an error, a microaddress control unit (21) for suplying an address to said micoprogram memory (82), a microinstructions register (25) for holding a microinstructions read out acording to the address supplied from said microaddress control unit (21), and an error detector (85) for detecting an error in said microinstructions, which comprises:
a memory (23) formed of a first section in which a plurality of microinstructions for controlling the operation of the electronic computer are stored and a second section in which at least one of data for the detection of an error in said microinstructions and data for controlling the suspension of the execution of said microinstructions;

an error detector (28), which, when data for the detection of an error is stored in the second section, detects an error in the microinstructions stored in the first section according to said error detection data;

a trace control circuit (29), which, when data for controlling the suspension of the execution of the microinstructions is stored in the second section, suspends the execution of the microinstructions stored in said first section of said memory (23);

a function switching control circuit (30) for suspending the operation of the microprogram memory (82) of the electronic computer and error detector (85), and sending forth a control signal to prevent from collision with the output from said memory (23) and said micoprogram memory (82); and a read control circuit (43) for reading the contents of said memory (23).

4. The microprogram-testing apparatus according to claim 1, 2 or 3, which further comprises an address stack (46) for holding data on the address specified by the microaddress control unit of the electronic computer upon receipt of a plurality of control signals from said trace control circuit (29).

5. The microprogram-testing apparatus according to claim 4, wherein the address stack comprises:
   a trace address counter (132) for counting a number of traced addresses; and
   a trace memory (131) for storing the addresses in which the microinstructions issued from said memory (23) are written according to the address specified by the contents of said trace address counter.

6. The microprogram-testing apparatus according to claim 1, 2 or 3, which further comprises:
   a counter (52); and
   a write control circuit (51) which writes microinstructions in the first section of said memory (23) and data for controlling the halt of the execution of said microinstructions in the second section, an sends forth a count value to the counter (52), so that the counter (52) counts data for controlling the halt of the execution of an microinstruction specified by the data stored in the second section of said memory (23) or a microinstruction specified by said trace control data, and wherein an enable signal delivered from said function switching control circuit (30) is supplied to said trace control circuit (29) and read control circuit (43) to permit the execution of said tracing and the microinstruction.

7. The microprogram-testing apparatus according to claim 1, 2 or 3, which further comprises:
   a write control circuit (51) for writing microinstructions in the first section of said memory (23) and data for the detection of an error in said microinstructions or data for controlling the halt of the execution of said microinstructions in the second section;
   a parity bit generator (80) for sending forth a parity bit uopn receipt of write data from said write control circuit (51);
   a first selector (77) for selecting data to be read out from the write control circuit and an output data from said parity bit generator (80) to the second section of said memory (23);
   a microprogram address control circuit (71) for supplying said memory (23) with the address in which data is to be written or from which data is to be fetched;
   a second selector (61) for slecting one of the output data from said micoprogram address control circuit (71) and an address bus (22);
   a first flip-flop (67) for latching an output from the second section of said memory (23);
   a parity check circuit (69) for carrying out parity check according to output data from the first section of said memory (23) and the second section of said memory (23); and
   a second flip-flop (68) for latching output data from said parity check circuit (69), and wherein said function switching control circuit (30) controls the operation of the first and second selectors (77, 61) and first and second flip-flops (67, 68).

8. The microprogram-testing apparatus according to claim 7, wherein said write control circuit (51) comprises:
   an input register (111) for holding data supplied from the input device;
   a plurality of data-holding registers (112, 113, 114, 115, 116) for holding data read out of said input register (111);
   a command register (117) for holding a command for instructing data to be written in the first and second sections of said memory (23); and
   a selector (118) for selecting one of said data-holding registers (112, 113, 114, 115, 116) and issuing a write-enabling signal to the first and second sections of said memory (23).

9. The microprogram-testing apparatus according to claim 1, 2 or 3, wherein the read control circuit comprises:
   first buffer means (141) for holding data delivered from the trace address counter;
   a flip-flop circuit (143) indicating data stored in and address stack;
   second buffer means (142) for holding an output from said flip-flop circuit (143);
   a multiplexer (146) for selectively sending forth the contents of the trace memory, and output data from the first and second sections of said memory (23); and
   a selector (147) for selecting one of the output data from the first and second buffer means (141, 142) and multiplexer (146).

10. The microprogram-testing apparatus according to claim 1, 2 or 3, wherein the function switching control circuit comprises:
    a first switch (91) for deciding which of the error detector and trace control circuit should be enabled;
    a second switch (92) for deciding which of the microprogram memory (82) if the electronic computer and the memory (23) of the microprogram-testing apparatus should be allowed to issue an output; and
    a group of gate circuits which issue a prescribed signal when supplied with an output from the first or second switch or outputs from both switches.

11. The microprogram-testing apparatus according to claim 1, 2 or 3, wherein the error detector (28) comprises a parity check circuit (69).

* * * * *